Figure 3:
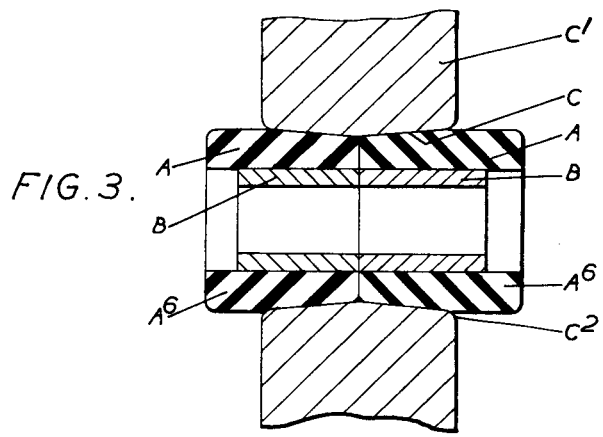

April 3, 1956 P. C. HUTTON 2,740,650
FLEXIBLE JOINTS
Filed Jan. 22, 1951

Inventor
Philip C. Hutton
By Emery, Holcombe & Blair
Attorney

United States Patent Office 2,740,650
Patented Apr. 3, 1956

2,740,650

FLEXIBLE JOINTS

Philip Charles Hutton, London, England, assignor to Silentbloc Limited, London, England, a company of Great Britain Application January 22, 1951, Serial No. 207,113

4 Claims. (Cl. 287—85)

This invention relates to flexible joints of the kind comprising an outer comparatively rigid member, usually formed of metal, having a bore therein, an inner comparatively rigid member, also usually of metal, lying in the bore in the outer member and having such external dimensions as to leave an annular space between its outer circumferential surface and the inner circumferential surface of the bore in the outer member, and one or more bushings of rubber disposed in the annular space between and engaging the inner and outer members and serving to connect the inner and outer members resiliently to one another, the rubber bushing or bushings having a degree of axial compression applied thereto which causes them to tend to expand radially in the annular space. The term "rubber" as used in this application includes both natural and synthetic rubbers, and combinations thereof.

Such joints usually comprise two rubber bushings which are inserted into opposite ends of the bore of the outer member and are pressed towards one another by pressure members, (hereinafter called pressure plates for convenience) engaging their outer end faces and carried by the inner member and in this case the bore of the outer member is often of double frusto conical form, while the outer circumferential surfaces of the bushings are similarly shaped so that the end force applied to the bushings not only tends to cause them to expand radially but also tends to cause a degree of radial compression thereof by forcing each bushing towards the smaller end of the frusto-conical bore in which it lies, and it is to this form of bearing of the kind in question to which the invention is particularly, though not exclusively, applicable.

In flexible joints of the kind referred to it is usual, in order to increase the resistance offered by the joint to relative axial movement between the inner and outer members and thus to enable the joint to take greater end thrust, to provide moulded outwardly extending radial flanges on the ends of the rubber bushings which, in the assembled joint extend and lie between an annular end face surrounding the end of the bore of the outer member and the opposed face of a pressure plate secured to the inner member.

It has also been proposed in bearings of the above kind to form the rubber bushing so that it is initially of the same length as the inner member and to form such flanges by providing a thrust plate or washer on each inner member capable of sliding over its end portion, which projects beyond the bore of the outer member, this thrust member or plate being caused to act on the exposed end face of the rubber bushing so as to shorten the bushing and thus cause the part thereof which remains beyond the bore of the outer member to bulge somewhat radially to form a shallow flange. Thus in such an arrangement the rubber bushing or each rubber bushing, in the assembled joint, is somewhat shorter than its associated inner member and the bulge resembling a shallow flange lies between the part of the end face of the outer member immediately surrounding the end of its bore and the adjacent face of the thrust plate.

The object of the present invention is to provide a flexible joint of the kind referred to which will be simple and inexpensive to manufacture and will yet provide satisfactory resistance to end thrust for normal purposes to the same degree as or a higher degree than the previously proposed joints having flanges formed either by moulding or by distortion of the end of the bushing in one or other of the ways described above.

In a flexible bearing of the kind referred to according to the present invention the rubber bushing or each rubber bushing when assembled on the inner member but otherwise undistorted projects at its outer end beyond the end of the inner member, this projecting end portion of the bushing is of approximately cylindrical form and not of greater external diameter than the outer end of the bore in the outer member and, during assembly of the bearing is axially compressed by a pressure member or plate secured to the inner member so as to be caused to expand radially and form a flange lying between the inner face of the pressure member and the adjacent end face of the outer member.

Conveniently the pressure member is in the form of a plate or washer which during the assembly process is drawn into close engagement with the end of the inner member which thus limits its movement. In this way it will be seen that by forming the inner member and the rubber bushing of appropriate dimensions the degree of distortion imposed during assembly on the end portion of the bushing, which initially projects beyond the outer end of the inner member, can be exactly determined.

The part of the rubber bushing which surrounds the inner member may either be bonded to the surface of the inner member or not and when not so bonded the bushing is preferably stretched on to the inner member so as to increase the friction between the bore of the rubber bushing and the inner member in the finally assembled joint. In this case it will be understood that a special initial formation of the rubber bushing will be necessary in order that when it has been stretched on to the inner member the part of the rubber bushing which projects beyond the end of the inner member will, before having further distortion imposed on it, be cylindrical in accordance with the invention. Thus in such an arrangement, when applied to a joint in which the bore of the outer member is frusto-conical and hence the outer surface of the part of the bushing which is to fit into this bore is of similar frusto-conical contour the rubber bushing in its original moulded condition, before being stretched on to the inner member will have a frusto-conical outer surface, while its bore will be cylindrical over that part which is to engage the inner member before assembly in the outer member and frusto-conical over that end part which is to extend beyond the inner member before assembly in the outer member. In addition the end face of the bushing surrounding the outer end of the frusto-conical part of its bore will be slightly frusto-conical with the apex of the imaginary cone lying beyond the adjacent end of the bushing.

In this way by using suitable cone angles for the frusto-conical surfaces in relation to the initial diameter of the bore and the external diameter of the inner member on to which the bushing is to be stretched the bushing, when stretched on to the inner member, will have a substantially cylindrical bore throughout its length and an outer surface which is frusto-conical over the part immediately surrounding the inner member and cylindrical over the part which extends beyond the end of the inner member.

Figure 4:
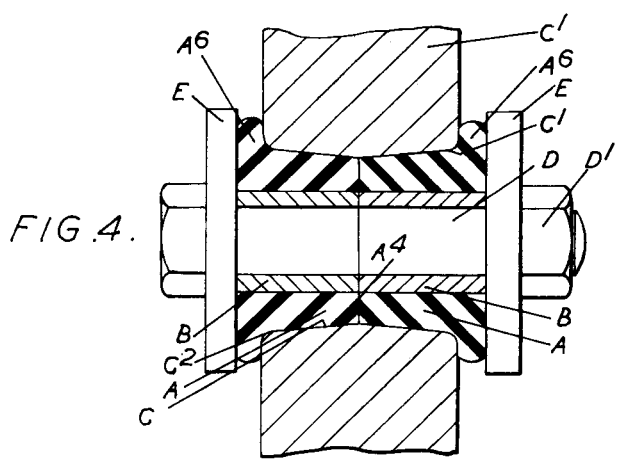
Figure 1:
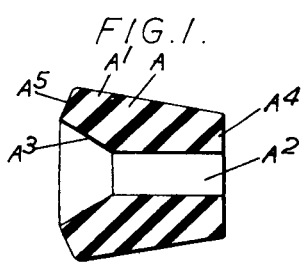
Figure 2:
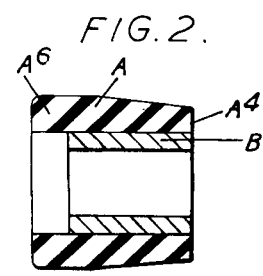

The invention may be carried into practice in various ways but one form of oscillating joint of the double conical type according to the invention, suitable for example for the pivotal connection of a spring or spring shackle or other pivotal connection in a spring suspension system of a vehicle, is illustrated by way of example in the accompanying drawings, in which, Figures 1, 2 and 3 illustrated in cross section show various stages in the manufacture and assembly of the joint, and Figure 4 shows, also in cross section the completely assembled joint, the cross section in each case being taken in a plane containing the axis of the rubber bushing or bushings.

The joint shown in Figure 4 comprises two rubber bushings A, each of which in its initial undistorted state has the cross sectional form shown in Figure 1, that is to say a form comprising a frusto-conical outer surface $A^1$, a bore which is partly constituted by a comparatively small diameter cylindrical part $A^2$ and partly by a frusto-conical part $A^3$ and end faces $A^4$, $A^5$, one of which, $A^4$, is flat, while the other, $A^5$ is of the wide angle frusto-conical form shown.

The first stage in the assembly of the joint comprises stretching two bushings A onto two cylindrical metal inner members B of considerably greater external diameter than the diameter of the bore $A^2$, this operation distorting each of the bushings A into the form shown in Figure 2 from which it will also be seen that the larger diameter end of the bushing A then constitutes a cylindrical extension $A^6$ beyond one end of the inner member B.

The two assemblies each comprising a bushing A and an inner member B as shown in Figure 2 are then inserted into opposite ends of a double frusto-conical bore C in a member $C^1$ which is to form the outer member of the joint as shown in Figure 3, the dimensions of the bore C being such, as shown that the inner ends of the inner members B and the end faces $A^4$ of the two rubber bushings lie in contact while the frusto-conical outer circumferential surfaces of the bushing A lie in contact with the surface of the bore C.

The final operation in the assembly of the joint is to insert a bolt D through the two inner members and through pressure plates E and the nut $D^1$ is tightened so that the pressure plates E compress and distort the end portions $A^6$ of the rubber bushings which previously projected beyond the ends of the inner members B so that, when the nut has been fully tightened, to bring the pressure plates E into contact with the ends of the inner members B, these end portions assume the form and position shown in Figure 4.

It will be seen that a radius $C^2$ is formed at each end of the bore C around which the end portions $A^6$ of the bushings A are pressed during their distortion by the pressure plates E.

The projection of each rubber bushing A beyond the end of its associated inner member B when assembled thereon as shown in Figure 2 may vary but in the case of an inner member B whose external diameter is say ¾" while the bore C has a diameter at its centre of 1¼" and a diameter at its ends excluding the radii $C^2$ of say 1⅜" or 1½" the length of the projecting portion $A^6$ beyond the end of the inner member B might be approximately ¼".

It will be seen that with joints according to the invention the end pressure applied to the ends of the rubber bushings A by the pressure plates E tends to be applied throughout the lengths of the bushings since initially the projecting ends $A^6$ of the bushings are cylindrical while, even after final distortion into the form shown in Figure 4, the tendency of the end portions $A^6$ of the bushings continuously to diminish in diameter and increase in axial length so as to re-assume their original undistorted form will tend to cause the parts of the bushings within the outer member to be maintained under compression and hence in close frictional contact with the surfaces of the inner and outer members B and C. Moreover, the initial stretching of each rubber bushing A onto its associated inner member B will tend to increase the frictional grip between the bushing and the inner member and thus to reduce the tendency for slip to occur between the rubber bushings and their inner members, that is to say at the point in the assembly where under excessive stresses such slip would otherwise be most likely to occur.

In addition it will be seen that the end portions $A^6$ of the bushing in the assembled joint have had their axial dimensions considerably reduced with corresponding increases in their radial dimensions. This not only tends to ensure good frictional grip between these ends and the surfaces between which they lie but to render these end portions well suited to resist end thrusts applied to the joint as a whole in use and to allow for appreciable relative rotational movement between such surfaces without overstressing the rubber.

It is to be understood that although in the construction more particularly described above with reference to the drawings each rubber bushing is separately formed and stretched onto its associated member, each rubber bushing may, instead, be bonded to their inner member while being provided with the required projecting cylindrical end portion in which case the assembly comprising the rubber bushing and inner member would resemble that shown in Figure 2 except that the bushing would be bonded in the moulding process or otherwise to the inner member.

What I claim as my invention and desire to secure by Letters Patent is:

1. A pivotal joint comprising an outer rigid member having a bore therein, two inner rigid members each having a substantially cylindrical outer surface lying partly within the bore in the outer member with their inner ends in contact and their outer ends projecting therefrom and having an external diameter less than that of said bore in said outer rigid member, thus leaving an annular space between the outer surface of the inner members and the surface of the bore of the outer member, two coaxial bushings of resilient flexible material respectively stretched upon said inner members and fitting in said annular space between the inner and outer members, each bushing having a cylindrical bore of smaller diameter in its free undistorted state than that of the outer surface of the inner member upon which it is stretched and an end portion projecting beyond the projecting outer end of said inner member, flange-like pressure members of greater diameter than the outer ends of the bore of the outer member and coaxially positioned against the projecting ends of said inner members and spaced thereby from the adjacent ends of said outer member, and separable and adjustable means independent of said inner members retaining said pressure members against axial movement away from said adjacent ends of said inner members and cooperating with said pressure members to apply an axial force to said projecting end portions of said bushings, wherein the projecting end portions of the assembled bushings without the application of said axial force are of approximately cylindrical form with an external diameter not substantially greater than the diameter of the adjacent end of the bore in the outer member and by said axial force are maintained in a distorted state so that their external diameter is substantially greater than the diameter of said adjacent end of said bore and they constitute flanges having transverse plane surfaces of substantial area gripped between said pressure members and the adjacent faces of said outer member while the parts of the said bushings which lie within the bore of said outer member are maintained in firm frictional engagement with the parts of the said inner and outer members between which they lie.

2. A flexible joint as claimed in claim 1 in which the bore in the outer rigid member tapers inwardly from both ends towards the middle and the inner ends of the two resilient bushings also taper inwardly and fit closely within said bore.

3. A flexible joint as claimed in claim 1 in which each rubber bushing in its undistorted state before application to its inner member has a frusto-conical outer surface and an inner surface which is cylindrical and of a diameter appreciably less than the external diameter of the inner member throughout the part thereof which is to receive the inner member and is frusto-conical throughout the end part which projects beyond the end of the inner member when the bushing is applied thereto, the dimensions of said bushing and inner member being such as to cause the bushing when applied to said inner member to have a frusto-conical outer surface encompassing that part which immediately surrounds the inner member while the projecting end part is approximately cylindrical.

4. A flexible joint as claimed in claim 3 in which the bore in the outer member in which each rubber bushing lies is frusto-conical and the outer surface of the part of the rubber bushing therein is similarly shaped.

References Cited in the file of this patent

UNITED STATES PATENTS

| | | |
|---|---|---|
| 1,833,002 | Smith | Nov. 24, 1931 |
| 2,103,729 | Leighton | Dec. 28, 1937 |
| 2,358,518 | Kraft | Sept. 19, 1944 |
| 2,366,860 | Kraft | Jan. 9, 1945 |
| 2,467,548 | Bradley | Apr. 19, 1949 |
| 2,468,311 | Grotenhuis | Apr. 26, 1949 |
| 2,468,985 | Krotz | May 3, 1949 |
| 2,517,791 | Hutton | Aug. 8, 1950 |
| 2,621,949 | Grantham | Dec. 16, 1952 |

FOREIGN PATENTS

| | | |
|---|---|---|
| 580,918 | Great Britain | 1946 |
| 679,651 | Great Britain | 1952 |